US012679387B2

(12) United States Patent
Hofbauer et al.

(10) Patent No.: US 12,679,387 B2
(45) Date of Patent: Jul. 14, 2026

(54) METHOD AND ASSISTANCE DEVICE FOR ASSISTING DRIVING OPERATION OF A MOTOR VEHICLE, AND MOTOR VEHICLE

(71) Applicant: Bayerische Motoren Werke Aktiengesellschaft, Munich (DE)

(72) Inventors: Markus Hofbauer, Munich (DE); Christopher Kuhn, Munich (DE); Goran Petrovic, Munich (DE); Eckehard Steinbach, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 669 days.

(21) Appl. No.: 17/735,495

(22) Filed: May 3, 2022

(65) Prior Publication Data

US 2022/0348211 A1 Nov. 3, 2022

(30) Foreign Application Priority Data

May 3, 2021 (DE) ..................... 10 2021 111 325.3

(51) Int. Cl.
 *B60W 50/00* (2006.01)
 *G01C 21/30* (2006.01)
 (Continued)

(52) U.S. Cl.
 CPC ......... *B60W 50/0098* (2013.01); *G01C 21/30* (2013.01); *G06V 10/98* (2022.01);
 (Continued)

(58) Field of Classification Search
 CPC ............. B60W 50/00; B60W 50/0098; B60W 2554/00; B60W 2554/20; B60W 2556/00;
 (Continued)

(56) References Cited

U.S. PATENT DOCUMENTS

2016/0221584 A1 8/2016 Fendt
2017/0313297 A1* 11/2017 Okada ................... B60W 40/04
 (Continued)

FOREIGN PATENT DOCUMENTS

DE 10 2013 220 016 A1 4/2015
DE 102016214045 A1 * 2/2018 ........... B60K 28/066
 (Continued)

OTHER PUBLICATIONS

Japanese-language Office Action issued in Japanese Application No. 2022-055432 dated Jul. 12, 2023 with English translation (8 pages).
 (Continued)

*Primary Examiner* — Khoi H Tran
*Assistant Examiner* — Sarah A Tran
(74) *Attorney, Agent, or Firm* — Crowell & Moring LLP

(57) ABSTRACT

A method and an assistance device assist automated driving operation of a motor vehicle. Surroundings raw data recorded by way of a surroundings sensor system of the motor vehicle are processed by the assistance device in order to generate semantic surroundings data. This is accomplished by carrying out semantic object recognition. Further, a comparison of predefined semantically annotated map data against the semantic surroundings data is performed. This involves static objects indicated in the map data being identified in the semantic surroundings data as far as possible. Discrepancies detected during the process are used to recognize perception errors of the assistance device. A recognized perception error prompts a predefined safety measure to be carried out.

14 Claims, 1 Drawing Sheet

Legend
10 road
12 motor vehicle
14 driver
16 assistance device
18 static surroundings objects
20 dynamic surroundings object
22 server device
24 surroundings sensor system
26 input interface
28 data memory
30 processor
32 map data
34 output interface
36 vehicle system

(51) Int. Cl.
 *G06V 10/98* (2022.01)
 *G06V 20/56* (2022.01)
 *G06V 20/70* (2022.01)

(52) U.S. Cl.
 CPC .............. *G06V 20/56* (2022.01); *G06V 20/70* (2022.01); *B60W 2554/20* (2020.02); *B60W 2556/40* (2020.02)

(58) Field of Classification Search
 CPC ......... B60W 2556/20; B60W 2556/35; B60W 2556/40; B60W 2556/45; B60W 2556/50; B60W 40/00; B60W 40/02; B60W 40/06; B60W 60/00; B60W 60/001; B60W 60/0015; B60W 2552/00; B60W 2552/05; B60W 2552/53; B60W 2555/00; B60W 2555/20; B60W 30/00; B60W 30/08; B60W 2420/00; B60W 2420/40; B60W 2420/403; B60W 2420/408; G01C 21/00; G01C 21/26; G01C 21/28; G01C 21/30; G01C 21/38; G01C 21/3804; G01C 21/3807; G01C 21/3811; G01C 21/3833; G01C 21/3837; G06V 10/00; G06V 10/98; G06V 20/00; G06V 20/50; G06V 20/56; G06V 20/70; G08G 1/00; G08G 1/09; G08G 1/16; G08G 1/0962; G08G 1/0967; G08G 1/096708; G08G 1/096733; G08G 1/096766; G08G 1/165; G08G 1/166; G08G 1/09623; G08G 1/09626; G08G 1/096716; G08G 1/096741; G08G 1/096775
 USPC ......................................................... 701/26
 See application file for complete search history.

(56) References Cited

U.S. PATENT DOCUMENTS

| 2018/0292840 | A1 | 10/2018 | Sakai | |
| 2019/0018410 | A1 | 1/2019 | Ando | |
| 2019/0220011 | A1 | 7/2019 | Della Penna | |
| 2021/0117725 | A1* | 4/2021 | Wang | G06V 20/00 |
| 2021/0403012 | A1 | 12/2021 | Keller et al. | |
| 2022/0177005 | A1* | 6/2022 | Gottbehüt | G01S 17/931 |
| 2022/0229153 | A1 | 7/2022 | Fassbender et al. | |
| 2022/0230452 | A1 | 7/2022 | Muto et al. | |

FOREIGN PATENT DOCUMENTS

| DE | 10 2016 225 213 A1 | 6/2018 |
| DE | 10 2018 005 970 A1 | 1/2020 |
| DE | 10 2018 127 059 A1 | 4/2020 |
| DE | 10 2019 002 487 A1 | 10/2020 |
| JP | 2016-99635 A | 5/2016 |
| JP | 2019-20782 A | 2/2019 |
| JP | 2020-184129 A | 11/2020 |
| JP | 2020-187472 A | 11/2020 |
| WO | WO 2017/109977 A1 | 6/2017 |
| WO | WO 2018/104563 A2 | 6/2018 |

OTHER PUBLICATIONS

English translation of German-language Search Report issued in German Application No. 10 2021 111 325.3 dated Nov. 22, 2021 (five (5) pages).

German-language Search Report issued in German Application No. 10 2021 111 325.3 dated Nov. 22, 2021 with English translation (10 pages).

German-language Office Action issued in German Application No. 10 2021 111 325.3 dated Apr. 25, 2022 with English translation (10 pages).

* cited by examiner

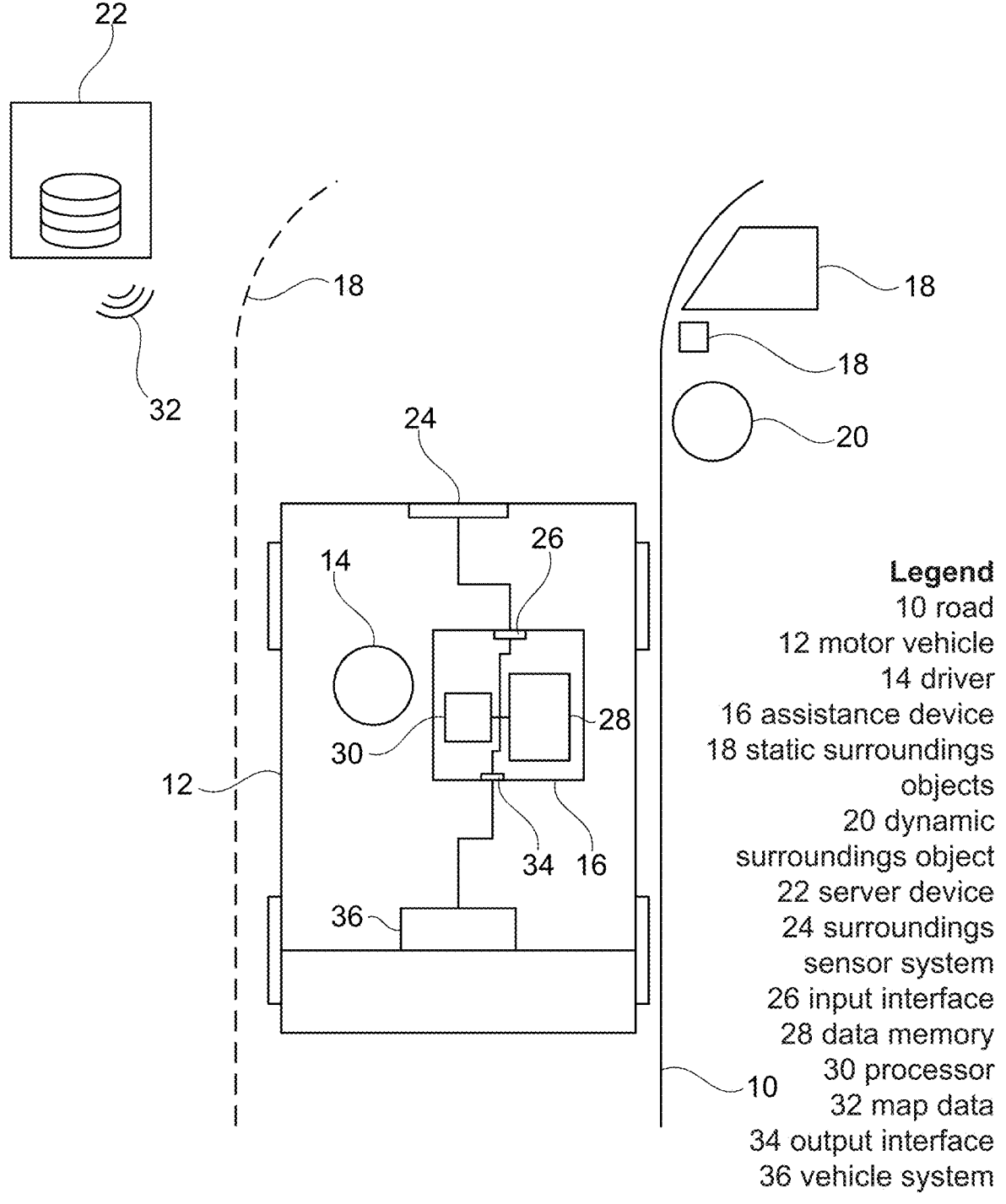
Legend
10 road
12 motor vehicle
14 driver
16 assistance device
18 static surroundings objects
20 dynamic surroundings object
22 server device
24 surroundings sensor system
26 input interface
28 data memory
30 processor
32 map data
34 output interface
36 vehicle system

METHOD AND ASSISTANCE DEVICE FOR ASSISTING DRIVING OPERATION OF A MOTOR VEHICLE, AND MOTOR VEHICLE

CROSS REFERENCE TO RELATED APPLICATION

This application claims priority under 35 U.S.C. § 119 from German Patent Application No. DE 10 2021 111 325.3, filed May 3, 2021, the entire disclosure of which is herein expressly incorporated by reference.

BACKGROUND AND SUMMARY

The present invention relates to a method for assisting at least partially automated driving operation of a motor vehicle. The invention also relates to an assistance device for a motor vehicle that is configured for such a method and to a motor vehicle that is equipped with said assistance device and is configured for at least partially automated driving operation.

Although the development of automated motor vehicles has made significant progress in recent years, it is not yet finished at present. Automated guidance, or the automated operation of motor vehicles, has a large number of associated individual problems and challenges. This concerns for example recognition and interpretation of respective surroundings of the motor vehicle, automatic trajectory planning or pathfinding for the motor vehicle and/or the like.

One approach described for example in WO 2018/104 563 A2 is a method for determining a geographical position and an orientation of a vehicle moving through a road network. This is supposed to involve a camera associated with the vehicle obtaining a sequence of images that reflect an environment of the road network. Each of the images has an associated camera position at which the image was recorded. At least some of the images and associated camera positions are taken as a basis for generating a local map representation that represents an area of the road network in which the vehicle moves. This local map representation is then compared with a relevant section of a reference map. This comparison is then supposed to be taken as a basis for determining the geographical position and the orientation of the vehicle within the road network. In this way, an autonomous vehicle is supposed to be able to locate itself in the world automatically in order to determine a safe strategy.

Another approach is described in US 2019/0 220 011 A1. There, driving parameters of the vehicle are supposed to be computed that are supposed to be used to allow driverless transit by an autonomous vehicle coextensively with a path of travel. Furthermore, data are observed that represent control signals of a control unit of the vehicle, and an event is detected. Storage of event data is then triggered and transmission control criteria are determined. The event data are then transmitted to a logic adaptation computation platform via a communication network. This is supposed to provide a solution for implementing autonomous control functions for resolving anomalies associated with the control of driverless vehicles, without the limitation of conventional techniques.

The object of the present invention is to allow particularly safe operation of an at least partially automated motor vehicle.

This object is achieved according to the invention by the subjects of the independent patent claims. Possible configurations and developments of the present invention are disclosed in the dependent patent claims, in the description and in the FIGURE.

A method according to the invention is used for assisting at least partially automated driving operation of a motor vehicle. It allows a driver of the motor vehicle to be directly assisted in driving the motor vehicle, allows particular current automated driving operation of the motor vehicle to be improved and/or allows future at least partially automated driving operation of the or a motor vehicle to be assisted or improved. The method according to the invention comprises multiple method steps, which in particular are carried out or may be carried out automatically.

In one method step of the method according to the invention, a surroundings sensor system of the motor vehicle is used to record surroundings raw data that map, or characterize, particular current surroundings of the motor vehicle. The surroundings sensor system may be or comprise for example at least one camera, a lidar, radar and/or ultrasonic device and/or suchlike. Accordingly, the surroundings raw data may be or comprise applicable measurement data that are provided directly by the surroundings sensor system. Similarly, the surroundings raw data may already have been processed or preprocessed in part. The particular current surroundings of the motor vehicle may be in particular an area that is at least theoretically within a sensor or sensing range of the surroundings sensor system of the motor vehicle.

In a further method step of the method according to the invention, an assistance device of the motor vehicle is used to generate semantic surroundings data from the surroundings raw data. This is accomplished by carrying out semantic object recognition on the surroundings raw data, or by applying said semantic object recognition thereto. In the present context, semantic object recognition such as this may be or comprise conventional object detection, for example for recognizing other road users, street furniture, obstacles, buildings and/or suchlike. Similarly, the semantic object recognition may be or comprise semantic segmentation. Objects in the present context may thus also be for example surrounding areas, such as for example a lane, a cycleway, a pedestrian crossing and/or suchlike. Similarly, the semantic object recognition may be or comprise object tracking or may constitute at least one substep of such object tracking. The semantic surroundings data may thus indicate which objects, that is to say what kind or what type of object, have been recognized or detected by the assistance device and where in the surroundings of the motor vehicle.

In a further method step of the method according to the invention, predefined semantically annotated map data of the surroundings of the motor vehicle are acquired, or provided. Static objects in the surroundings are indicated in these semantically annotated map data. In other words, objects, in particular nonmoving objects, forming permanent parts of the surroundings are located, that is to say localized, in the map data and semantically described, that is to say in respect of their type or their kind. The map data may thus comprise coordinates or position statements and semantic labels or annotations of static objects such as these in the surroundings.

Static objects in the present context may be or comprise for example traffic routes, road boundaries, road markings, street furniture, such as for example traffic lights, road signs, crash barriers and/or suchlike, buildings or construction, median strips and/or suchlike. The map data may indicate in particular only static objects such as these and no dynamic objects. Dynamic objects in this context may be moving objects that are present in the surroundings only temporarily, such as for example other road users. The map data may be or comprise in particular what are known as HD maps, that is to say highly accurate maps. The method according to the invention may function all the better the more accurate, high-resolution and detailed the map data are, but without there being a specific hard limit therefor for the use or usability of the invention. Preferably, the map data may have a resolution in the centimeter to meter range and/or may be fully annotated, that is to say may assign a semantic anno- tation or classification to all areas.

The acquiring of the map data may mean or comprise for example the retrieving or loading thereof from a data memory, via an interface or from a, for example vehicle- external, server device. This acquiring of the map data may be performed before, during or immediately after the sur- roundings raw data are recorded.

In a further method step of the method according to the invention, a comparison of the acquired semantically anno- tated map data against the respective semantic surroundings data is performed. This involves the static objects in the map data being identified in the semantic surroundings data as far as possible, that is to say insofar as they are indicated in the semantic surroundings data. In other words, that is to say that association of the objects indicated in the map data or by the map data with parts, areas or objects in the semantic surroundings data is performed or attempted. That is to say that mapping of the map data, or of the objects indicated therein, to the semantic surroundings data, that is to say a perception or a scene comprehension of the assistance device, may be performed. The particular map data to be used therefor may be determined or selected for example on the basis of a particular current position of the motor vehicle in a coordinate system fixed for the world—for example automatically determined by means of a satellite-assisted position determination system—and/or by means of feature- or detail-based association (feature mapping).

During this comparison of the map data against the semantic surroundings data, discrepancies, that is to say deviations or inconsistencies, may be determined between the map data, or the objects indicated therein, and the semantic surroundings data, that is to say objects recognized by the assistance device on the basis of the surroundings raw data. One or more such detected discrepancies between the map data and the semantic surroundings data is/are used in a further method step of the method according to the invention to recognize a perception error of the assistance device, if necessary. That is to say that there may be a perception error if the semantic object recognition, or an applicable scene comprehension, of the assistance device has or generates an inconsistency with or a deviation from the map data, in particular in respect of at least one static object, for example the position and/or semantic association or classification thereof, that is to say the type or kind thereof. Such a perception error may exist for example if the assistance device has not recognized or has incorrectly semantically interpreted or labeled at least one object in the surroundings or suchlike.

In a further method step of the method according to the invention, a recognized perception error such as this auto- matically prompts a predefined safety measure to be carried out. This may mean or comprise for example outputting a warning, for example in order to indicate that an assistance function of the motor vehicle has no or only restricted functionality or availability, outputting a takeover prompt for manual control of the motor vehicle to be taken over by a driver, switching to a safe driving mode, changing to a safety trajectory that allows at least safe, in particular collision-free, stopping of the motor vehicle, triggering separate or permanent storage of the underlying surround- ings raw data and/or semantic surroundings data and/or suchlike.

Overall, the method according to the invention may be regarded as a method for automatically detecting or recog- nizing errors in an automatic scene comprehension of an on-vehicle assistance system. The present invention is based on the insight that at least motor vehicle assistance systems that are available today by no means operate perfectly or with one hundred percent reliability, but rather recurrently make errors, and semantically annotated map data available for respective surroundings may be used as what is known as ground truth, that is to say as a reliable reference for recognizing such errors or misinterpretations. By way of example, this may be regarded in contrast to opposite approaches in which applicable map data are generated or updated on the basis of object or surroundings recognition performed on the vehicle. The latter may lead to errors by the applicable on-vehicle assistance system being incorpo- rated into the map data and does not allow reliable recog- nition of such errors of the assistance system.

On the other hand, as a result of the comparison of the on-vehicle scene comprehension against the typically more reliable, that is to say particularly low-error or even error- free, semantically annotated map data, the present invention allows particularly reliable and safe at least partially auto- mated driving operation of the or a motor vehicle. This may be accomplished by immediately recognizing discrepancies, that is to say inconsistencies or errors, in the semantic object recognition performed on the vehicle, which allows an immediate, appropriately adapted reaction at least substan- tially in real time, that is to say during the ongoing driving operation. Additionally or alternatively, the described rec- ognition of the discrepancies, or perception errors, may allow particularly effective and efficient collection of data that are particularly problematic for the assistance device, or the semantic object recognition, known as edge cases. These data, that is to say for example the associated or underlying surroundings raw data and/or semantic surroundings data, may then be used as a basis for an error analysis, for later improvement of the assistance device, or of the semantic object recognition, and/or for generating training data for the or an appropriate improved assistance device. That is to say that such generation allows future at least partially auto- mated driving operation of the or a motor vehicle with improved safety, since the applicable assistance device may be trained on the basis of the collected data that have led to discrepancies or perception errors in the past.

In one possible configuration of the present invention, the comparison involves at least some of the map data being projected into the respective surroundings data or a sur- roundings model of the respective surroundings that is generated therefrom. On the basis of that, that is to say on the basis of the combination of the map data and the semantic surroundings data, a resultant object-by-object overlap is determined. Here, it is possible to use for example the objects, or corresponding object data, that are expected in the respective semantic surroundings data according to the map data with spatial coordinates that localize the objects indicated in the map data. That is to say that if the map data describe an area that goes beyond the area described by the semantic surroundings data, it is thus possible to dispense with data processing complexity by using only map data that are relevant to the spatial area actually described by the semantic surroundings data.

The projecting of the map data, or of the applicable part of the map data, into the semantic surroundings data, or the surroundings model, may comprise for example an appropriate coordinate transformation, a rotation, that is to say an adaptation of a viewing angle, a perspective distortion, a size adaptation or scaling and/or suchlike, in order to achieve consistency of the map data and of the surroundings data at least in this respect. That is to say that the map data, or the objects indicated therein, may be overlaid with the semantic surroundings data, or the surroundings model. Ideally, the objects indicated in the map data and the objects recognized by means of the semantic object recognition and indicated in the semantic surroundings data, or accordingly in the surroundings model, would then overlap exactly. However, discrepancies or perception errors of the assistance device may lead to only a partial overlap or overlapping of the objects indicated in the map data and the objects indicated in the semantic surroundings data or the surroundings model. If a specific object has not been recognized by the semantic object recognition, then a complete absence of overlap, that is to say an overlap of 0, may result, since no object or a differently semantically annotated or classified object is indicated or located in the semantic surroundings data or the surroundings model instead of the object indicated by the map data. The overlap may be individually determined on an object-by-object basis, that is to say for each object indicated in the map data, in order to recognize the discrepancies. The method proposed here for the comparison can allow particularly robust recognition of the discrepancies and particularly accurate localization of the locations of the discrepancies.

In one possible development of the present invention, a discrepancy and/or a perception error is recognized whenever the overlap between an object in the map data and—if present—an object in the semantic surroundings data or in the model generated therefrom that has been localized at an appropriate place is below a predefined threshold. This threshold may be indicated in absolute or relative terms. That is to say that the threshold proposed here allows correspondingly smaller discrepancies to be ignored. This can lead to reduced data processing complexity and more user-friendly or more convenient driving operation of the motor vehicle, without significantly reducing the safety thereof. The configuration of the present invention that is proposed here is based on the insight that correspondingly small discrepancies are ultimately typically not significant for safe driving or operation of the motor vehicle, so long as the respective object has been recognized at least substantially semantically correctly and at the correct place. By way of example, an erroneous semantic association of a few percent of the pixels or surface area of an object or a position of an object that is erroneously determined by a few centimeters may be irrelevant in practice if the object has been semantically recognized, that is to say classified, correctly, or there is provision for a safety margin of several meters anyway. That is to say that by ignoring or filtering out correspondingly small discrepancies, it is possible to reduce a number of safety measures that are ultimately carried out unnecessarily.

As already indicated, not only may the overlap be determined on the basis of the position, or the spatial coordinates, it may also allow for the semantics. If for example the semantic object recognition has admittedly correctly recognized, or located, an object spatially, that is to say in respect of its physical position or size, but has semantically classified it incorrectly, it is then still possible for an overlap of 0 to be determined, since there is then a correspondingly area-by-area semantic discrepancy.

In a further possible configuration of the present invention, the comparison, that is to say a result of the comparison, and/or the possibly recognized discrepancies is/are taken as a basis for assigning confidence values to the semantic surroundings data on an object-by-object basis. In other words, the semantic surroundings data, or the objects indicated therein, or the applicable object recognitions, are annotated or labeled accordingly. The confidence values, or labels or annotations, used may be for example "correct", "erroneous", "unsafe" or respective, for example percentage, confidence values or ranges. The latter may be ascertained for example in accordance with the, for example percentage, specific overlap described elsewhere. The confidence values proposed here may then be taken into consideration in a further or later processing or decision pipeline of the assistance device and/or of another vehicle-internal or vehicle-external device. By way of example, appropriate weightings may be allocated and/or decisions made according to the confidence values. If there are for example multiple options for controlling or driving the motor vehicle, the option that is at least for the greater part based on "correctly" labeled objects or areas may be selected. This can likewise allow more reliable and/or safer at least partially automated driving operation of the motor vehicle.

In a further possible configuration of the present invention, the map data comprise further details relating to the static objects beyond a semantic identification, that is to say a semantic descriptor or indication of type, and a spatial position or location of the static objects. As such, the map data may indicate a respective size of the objects, for example. These further details relating to the static objects are then taken into consideration for the comparison and/or the at least partially automated driving operation of the motor vehicle. The further details may likewise comprise or relate to for example a material or a reflectivity, if necessary a period of a probable presence, a period of a relevance or validity, for example of objects such as road signs or routing directions or the like, and/or suchlike. This can allow particularly reliable, robust and relevant recognition of discrepancies or perception errors.

If for example a road sign that is valid for a limited time is not correctly recognized by the assistance device, then the applicable discrepancy or the applicable perception error may be rejected, that is to say that the taking of an applicable safety measure may be dispensed with, outside the validity period indicated in the map data. If, in another example, the map data indicate a particularly high level of reflectivity of the respective object, then for example a recognized discrepancy or a recognized perception error may initially result in a dazzling effect being assumed that might not occur from a different viewing angle, that is to say a different position of the motor vehicle. In such a case, for example the triggering of the safety measure may then be delayed in order to await possibly correct object recognition from a different position of the motor vehicle. Similarly, a reflectivity that is indicated as particularly high or particularly low may for example automatically result in a different or additional surroundings sensor system being used to record the respective object or surrounding area, so as possibly to still allow correct object recognition. Overall, the further details may thus indicate additional data or information, or metadata, of the objects that can allow even more robust, more reliable and/or safer operation of at least partially automated driving operation of the motor vehicle.

In a further possible configuration of the present invention, a perception error is recognized only when the applicable discrepancy has been recognized repeatedly, at least over a predefined period of time and/or at least over a predefined distance covered by the motor vehicle, on the basis of surroundings raw data recorded at different times and/or from different positions of the motor vehicle. In other words, that is to say that a perception error is not recognized on the basis of a single observation or single instance of a discrepancy, or a snapshot of the surroundings. Rather, the perception error is recognized as such—and accordingly the safety measure is taken or triggered—only when the discrepancy exists, or has been confirmed, repeatedly, over a certain time, from different viewing angles or from different positions. This makes it possible to avoid or reduce for example ultimately unnecessary taking of the safety measure, for example owing to the respective static object being covered by a dynamic object only briefly or owing to errors in the object recognition that occur only from specific viewing angles or from specific positions, for example owing to dazzling effects, reflections or adverse reflection properties. That is to say that the configuration of the present invention that is proposed here therefore allows more robust recognition of perception errors and therefore accordingly robust and convenient at least partially automated driving operation of the motor vehicle.

In a further possible configuration of the present invention, a scene complexity for the respective surroundings is automatically assessed or determined on the basis of the recognized discrepancies and/or perception errors. A higher scene complexity may be determined for example for a greater number and/or a greater extent or a greater severity of discrepancies and/or perception errors. The assessed or determined scene complexity, that is to say for example an applicable measure or rating, may then be provided for further purposes. By way of example, the scene complexity may be used as a basis for further decisions for the at least partially automated driving operation of the motor vehicle.

Additionally or alternatively, the scene complexity may be taken as a basis for collecting, that is to say storing, associated data, for example the associated or underlying surroundings raw data or semantic surroundings data and/or state data that describe a state of the motor vehicle existing at the applicable time, for scenes or situations categorized as particularly complex, that is to say scenes or situations for which a scene complexity above a predefined threshold has been assessed or determined. These may then be used as a basis for a later error analysis, improvement of the assistance device and/or for generating training data for configuring the machine learning or the like. The scene complexity assessed or determined on the discrepancies and/or perception errors as a guideline or criterion for collecting or storing these data allows particularly effective and efficient collection or storage of particularly relevant data, for example relatively rare edge cases or the like. Such data conventionally cannot be obtained reliably or may be obtained only with enormous effort. The configuration of the present invention that is proposed here therefore affords a particularly effective and efficient way of ultimately improving the safety of the at least partially automated driving operation of the or a motor vehicle.

In a further possible configuration of the present invention, the map data that are relevant to a particular current or subsequent, or impending, journey section are automatically retrieved, that is to say loaded into the motor vehicle, from a vehicle-external server device by degrees during the driving operation of the motor vehicle, that is to say while said motor vehicle is moving. A vehicle-external server device such as this may be for example a backend, a cloud server or the like in which all available semantically annotated map data are stored.

The particular relevant map data describe the surroundings of the motor vehicle in each case to a predefined, limited extent beyond a range of the surroundings sensor system of said motor vehicle that is configured to record the surroundings raw data. In particular, map data are deemed relevant if they describe surroundings or an area that are/is, or will probably be, in range of the surroundings sensor system at present or in future, in particular during current driving operation, that is to say during the current journey of the motor vehicle. The relevant map data may describe the surroundings or an area, that is to say for example within a predefined radius of a particular current position of the motor vehicle, in the direction of travel of said motor vehicle up to a predefined distance ahead or in a corridor of predefined width along a current or planned journey route of the motor vehicle. In other words, a subset of all semantically annotated map data stored in the vehicle-external server device that is relevant or will probably become relevant during current driving operation may be loaded into the motor vehicle as required.

This allows feasible use of the map data given limited, feasibly manageable hardware complexity for the motor vehicle. This is due to the insight that the semantically annotated map data may require a considerable amount of storage space that, if the annotation is appropriately detailed and the level of detail of the map data is correspondingly high, may go far beyond the storage space requirement of conventional map data. An appropriate data storage capacity might not be provided feasibly and economically in every motor vehicle, however. The map data may be retrieved, or transmitted, by way of a wireless data connection, for example a mobile radio connection or the like.

Map data that are relevant to a particular past journey section, that is to say map data that are at least probably no longer required during current driving operation, may analogously be erased in or from the motor vehicle, or a data memory of the motor vehicle, by degrees during driving operation. These map data remain in the server device, however, which means that they may be retrieved again at a later time, for example during later driving operation of the motor vehicle in the same spatial area, if required.

A further aspect of the present invention is an assistance device for a motor vehicle. The assistance device according to the invention comprises at least one input interface for acquiring surroundings raw data and semantically annotated map data, a data processing device for processing the surroundings raw data and map data and an output interface for outputting a resultant result signal. The assistance device according to the invention is configured to, in particular automatically, carry out at least one variant or embodiment of the method according to the invention. To this end, the data processing device may comprise for example a computer-readable data memory and a processor device, for example a microprocessor, microchip or microcontroller, connected thereto for executing program code stored in the data memory device. Such program code stored in the data memory device may be for example an operating or computer program that represents, encodes or implements the sequences, method steps or measures of the method according to the invention and is executable by the processor device in order to cause the corresponding method to be carried out.

A further aspect of the present invention is a motor vehicle that comprises a surroundings sensor system for recording surroundings raw data and an assistance device according to the invention that is connected thereto. The motor vehicle according to the invention may thus be configured to, in particular automatically, carry out at least one variant or embodiment of the method according to the invention. The motor vehicle according to the invention may in particular be the motor vehicle cited in connection with the method according to the invention and/or in connection with the assistance device according to the invention.

Other objects, advantages and novel features of the present invention will become apparent from the following detailed description of one or more preferred embodiments when considered in conjunction with the accompanying drawing.

BRIEF DESCRIPTION OF THE DRAWING

The single drawing FIGURE is a schematic overview representation illustrating map-based assistance of automated driving operation of a motor vehicle.

DETAILED DESCRIPTION OF THE DRAWING

FIG. 1 is a schematic overview representation with a road 10 on which a motor vehicle 12 moves in assisted or at least partially automated driving operation. The motor vehicle 12 may be at least temporarily controlled by a driver 14, but is configured for at least partially automated driving operation. To this end, the motor vehicle 12 comprises an assistance device 16 here.

There are various objects in the surroundings of the motor vehicle 12, said objects being divided into static surroundings objects 18 and dynamic surroundings objects 20 here. Here, the static surroundings objects 18 are for example some street signs/structures, a road marking and a building. The dynamic surroundings object 20 may be for example a pedestrian or the like, who can move, that is to say is not a permanent part of the respective surroundings.

Additionally, a vehicle-external server device 22, which is discussed elsewhere, is depicted here.

Accurate perception or capture and interpretation of respective surroundings of the motor vehicle 12 is of essential significance to safe automated driving operation. To this end, the motor vehicle 12 comprises a surroundings sensor system 24. This surroundings sensor system 24 may record surroundings raw data that map or characterize respective surroundings of the motor vehicle 12—ideally including the static surroundings objects 18 and, if appropriate, the dynamic surroundings object 20. These surroundings raw data may be acquired by the assistance device 16 by way of an input interface 26 and subsequently processed. To this end, the assistance device 16 comprises a computer-readable data memory 28 and a processor 30 connected thereto, which are indicated schematically here. The assistance device 16 may thus execute, or apply to the acquired surroundings raw data, so-called computer vision, that is to say semantic data processing of the surroundings raw data. By way of example, an appropriately trained model, such as for example an artificial neural network or the like, may be stored in the data memory 28 for this purpose. It is thus possible for object recognition, object tracking and/or semantic segmentation or the like to be carried out in order to generate a semantic perception or a scene comprehension of the respective surroundings from the acquired surroundings raw data.

However, it is possible to observe that such models available today may occasionally make errors, that is to say may not, may incompletely or may incorrectly recognize, or classify, objects, for example. To overcome this problem, predefined HD maps, that is to say highly detailed semantically annotated maps, of the respective surroundings are used in the present case. Such maps may be stored in the data memory 28 and/or retrieved from the server device 22 by the assistance device 16, for example. The latter is indicated schematically here as an applicable signal transfer of map data 32 from the server device 22 to the motor vehicle 12.

These map data 32 provide a reliable description, that is to say one that is assumed to be true, of the respective surroundings, or at least of the static surroundings objects 18 contained therein. The map data 32 may therefore be used as a reference in order to ascertain whether the scene comprehension of the assistance device 16 based on the acquired surroundings raw data is correct, or consistent with data or information about the respective surroundings that are/is indicated in the map data 32. Although the map data 32 typically cannot describe the dynamic surroundings object 20 here, they can describe the static surroundings objects 18, that is to say for example areas or details that are relevant to the driving operation or the driving of the motor vehicle 12, such as for example a lane profile, road signs, obstacles, buildings and/or the like. A misclassification of such areas or details, or objects, by the assistance device 16 on the basis of the surroundings raw data acquired by means of the surroundings sensor system 24 may then be detected on the basis of a comparison against the map data 32.

The static surroundings objects 18 described by the map data 32 are invariable or only relatively slowly changing details that, by way of example, at least do not change daily or weekly. By contrast, previously available models for semantic surroundings sensing or object recognition may make errors very much more frequently. The comparison or the consistency check between the scene comprehension of the assistance device 16 based on the acquired surroundings raw data and the map data 32 thus allows automatic recognition of at least some of these errors of the assistance device 16, or of the latter's model configured for semantic surroundings recognition.

This error recognition may be particularly reliable here, since the described method is not solely reliant on the assistance device 16, or the model thereof, or the surroundings sensor system 24, or the surroundings raw data acquired by means of the latter, that is to say a respective available sensor input, but rather uses robust and particularly reliable reference data that are available independently of the situation in the form of the map data 32. That is to say that the error recognition may rely on, for example manually annotated, true data (ground truth data), instead of using solely dynamic predictions, that is to say predictions that are automatically generated during driving operation of the motor vehicle 12.

The comparison of the scene comprehension, that is to say of the semantic surroundings perception, or perception, of the assistance device 16 against the map data 32 may be performed automatically by an appropriate predefined model, for example. Such a model may be, comprise or use for example an artificial deep neural network, an occupancy grid.

If a specific static surroundings object 18 is indicated in the map data 32, it may be mapped to the corresponding surroundings raw data or to semantic surroundings data generated therefrom or to a surroundings model generated therefrom, that is to say ultimately at least indirectly also for example to applicable camera images, lidar images, radar images or the like. By way of example, the static surroundings objects 18 indicated in the map data 32 may be projected into an applicable RGB camera image or a lidar point cloud and then compared with the objects detected or recognized by the assistance device 16 on the basis of the acquired surroundings raw data. A respective overlap may then be determined, for example on an object-by-object basis. If this overlap is below a predefined threshold for at least one object, the respective object may be regarded as not correctly classified or not correctly recognized, that is to say for example may be labeled in an appropriate manner.

Based on the acquired surroundings raw data, the assistance device 16 may not recognize or may erroneously classify a static surroundings object 18, for example owing to concealment, here for example by the dynamic surroundings object 20, or owing to errors in the recognition or detection model used. In both cases, the method proposed here permits automatic recognition of the circumstance that the semantic perception, that is to say the scene comprehension, of the assistance device 16 may be restricted on the basis of the acquired surroundings raw data, that is to say does not necessarily represent or allow comprehensive correct recognition or comprehension of the respective surroundings or scene.

Additionally or alternatively, the comparison of the semantic scene comprehension of the assistance device 16 based on the acquired surroundings raw data against the map data 32 may be used to determine or rate a performance of the assistance device 16, or of the recognition, detection or perception module or model thereof. In particular, it is thus possible—even though only the static surroundings objects 18 are indicated in the map data 32—to rate the performance beyond the correct detection or recognition of the static surroundings objects 18 indicated in the map data 32. If static surroundings objects 18 such as these indicated in the map data 32 are not recognized, are recognized incompletely or are recognized erroneously by the assistance device 16 on the basis of the acquired surroundings raw data, then there is an increased likelihood of being able to expect sensor concealment, that is to say impairment of the surroundings sensor system 24, adverse ambient or weather conditions, the presence of a so-called out-of-distribution input or the like. The latter denotes inputs, data or situations that are outside a bandwidth or a spectrum for which the assistance device 16 is configured or trained. Impaired performance of the recognition of the dynamic surroundings objects 20 can then accordingly also be expected. This may then be taken into consideration as appropriate, for example by no longer providing an applicable automated driving or operating function of the motor vehicle 12 that is based on such object recognition, outputting a takeover prompt to the driver 14 and/or the like.

Inconsistencies between the semantic scene comprehension of the assistance device 16 based on the acquired surroundings raw data and the map data 32 may likewise be used as a gauge or basis for assessing a scene complexity. Depending on this scene complexity, for example if it is above a predefined threshold, appropriate predefined countermeasures or safety measures may then be automatically taken or carried out, such as for example an automatic change to a safety driving mode or the like.

Depending on the situation, the assistance device 16 may generate a resultant result or control signal and output it by way of an output interface 34, for example in order to actuate a vehicle system 36. The vehicle system 36 may be an—depending on the predefined functionality of the assistance device 16—ultimately almost arbitrary device of the motor vehicle 12, for example part of a drivetrain or an output device for outputting a signal or a warning to the driver 14 or the like.

Overall, the examples described show how automatic detection of perception or scene comprehension errors of an assistance system of a vehicle may be realized by observing or recognizing discrepancies or inconsistencies with predefined HD maps, in order to allow particularly safe operation of an at least partially automated vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

10 road
12 motor vehicle
14 driver
16 assistance device
18 static surroundings objects
20 dynamic surroundings object
22 server device
24 surroundings sensor system
26 input interface
28 data memory
30 processor
32 map data
34 output interface
36 vehicle system

What is claimed is:

1. A method for assisting at least partially automated driving operation of a motor vehicle, comprising:
   recording, via a surroundings sensor system of the motor vehicle, surroundings raw data that map particular current surroundings of the motor vehicle;
   generating, via an assistance device of the motor vehicle, semantic surroundings data from the surroundings raw data by carrying out semantic object recognition on the surroundings raw data;
   acquiring predefined semantically annotated map data of the surroundings of the motor vehicle, in which static objects in the surroundings are indicated;
   comparing the map data against the semantic surroundings data, wherein the static objects in the map data are identified in the semantic surroundings data; and
   detecting discrepancies between the map data and the semantic surroundings data during to recognize perception errors of the assistance device;
   wherein a recognized perception error prompts a predefined safety measure to be carried out, and
   wherein a scene complexity for the respective surroundings is automatically assessed on the basis of the recognized discrepancies and/or perception errors and a scene complexity rating is generated based on the recognized discrepancies and/or perception errors, wherein a higher scene complexity rating is generated as a result of a greater number, a greater extent, and/or a greater severity of the recognized discrepancies and/or perception errors.

2. The method according to claim 1, wherein
   the comparison involves at least some of the map data being projected into the respective semantic surroundings data or a surroundings model of the respective surroundings that is generated therefrom and a resultant object-by-object overlap being determined.

3. The method according to claim 2, wherein a discrepancy and/or a perception error is recognized whenever the overlap between an object in the map data and, when present, an object in the semantic surroundings data or in the model generated therefrom that has been localized at an appropriate place is below a predefined threshold.

4. The method according to claim 1, wherein the comparison and/or the recognized discrepancies is/are taken as a basis for assigning confidence values to the semantic surroundings data on an object-by-object basis.

5. The method according to claim 1, wherein the map data comprise further details relating to the static objects beyond a semantic identification and a position of the static objects, and said further details are taken into consideration for the comparison and/or the at least partially automated driving operation of the motor vehicle.

6. The method according to claim 5, wherein the further details include a size of the static objects.

7. The method according to claim 1, wherein a perception error is recognized only when the applicable discrepancy has been recognized repeatedly, at least over a predefined period of time and/or at least over a predefined distance covered by the motor vehicle, on the basis of surroundings raw data recorded at different times and/or from different positions of the motor vehicle.

8. The method according to claim 1, wherein the map data that are relevant to a particular current or impending journey section are automatically retrieved from a vehicle-external server device by degrees during driving operation of the motor vehicle, and the particular relevant map data describes the surroundings of the motor vehicle in each case to a predefined extent beyond a range of the surroundings sensor system of said motor vehicle that is configured to record the surroundings raw data.

9. The method according to claim 1, comprising:

determining that the scene complexity rating exceeds a threshold; and in response to determining that the scene complexity rating exceeds the threshold, storing the surroundings raw data and/or the semantic surroundings data for subsequent error analysis, improvement of the assistance device, and/or generation of training data for a machine learning device.

10. An assistance device for a motor vehicle, comprising:

an input interface that acquires surroundings raw data and semantically annotated map data;

a data processor that processes the surroundings raw data and map data; and an output interface that outputs a resultant result signal, wherein the data processor is configured to:

record surroundings raw data that map particular current surroundings of the motor vehicle;

generate semantic surroundings data from the surroundings raw data by carrying out semantic object recognition on the surroundings raw data;

acquire predefined semantically annotated map data of the surroundings of the motor vehicle, in which static objects in the surroundings are indicated;

compare the map data against the semantic surroundings data, wherein the static objects in the map data are identified in the semantic surroundings data;

detect discrepancies between the map data and the semantic surroundings data to recognize perception errors of the assistance device, wherein a recognized perception error prompts a predefined safety measure to be carried out; and automatically assess a scene complexity for the respective surroundings on a basis of the recognized discrepancies and/or perception errors, and generating a scene complexity rating based on the recognized discrepancies and/or perception errors, wherein a higher scene complexity rating results from a greater number, a greater extent, and/or a greater severity of the recognized discrepancies and/or perception errors.

11. A motor vehicle, comprising:

a surroundings sensor system that records surrounding raw data; and an assistance device according to claim 10.

12. The assistance device according to claim 10, wherein the data processor is configured to:

determine whether the scene complexity rating exceeds a threshold; and in response to determining that the scene complexity rating exceeds the threshold, store the surroundings raw data and/or the semantic surroundings data for subsequent error analysis, improvement of the assistance device, and/or generation of training data for a machine learning device.

13. The assistance device according to claim 12, wherein the data processor is configured to:

in response to determining that the scene complexity rating does not exceed the threshold, abstain from storing the surroundings raw data and/or the semantic surroundings data for subsequent use.

14. The assistance device according to claim 10, wherein the data processor is configured to:

determine that the scene complexity rating does not exceed a threshold; and in response to determining that the scene complexity rating does not exceed the threshold, abstain from storing the surroundings raw data and/or the semantic surroundings data for subsequent use.

* * * * *